United States Patent [19]

Okamoto et al.

[11] 3,906,056
[45] Sept. 16, 1975

[54] COMPOSITION COMPRISING AN ETHYLENE-PROPYLENE RUBBER AND AN AMORPHORES ETHYLENE-PROPYLENE BLOCK COPOLYMER

[75] Inventors: Yasushi Okamoto; Masayoshi Morimoto, both of Ichibara, Japan

[73] Assignee: Sumitomo Chemical Company, Limited, Osaka, Japan

[22] Filed: Jan. 16, 1973

[21] Appl. No.: 324,233

[30] Foreign Application Priority Data
Jan. 19, 1972  Japan.................................. 47-7833

[52] U.S. Cl. ..... 260/876 B; 260/878 B; 260/878 R; 260/897 A
[51] Int. Cl.² ..................... C08L 51/00; C08L 53/00
[58] Field of Search ......... 260/897 A, 876 B, 878 B

[56] References Cited
UNITED STATES PATENTS

| | | | |
|---|---|---|---|
| 3,478,128 | 11/1969 | Hagemeyer et al. | 260/876 B |
| 3,572,721 | 3/1971 | Harrison et al. | 260/876 B |
| 3,634,546 | 1/1972 | Hagemeyer et al. | 260/876 R |
| 3,645,817 | 2/1972 | Walker et al. | 260/876 B |
| 3,689,595 | 9/1972 | Gwinn | 260/876 B |

*Primary Examiner*—Richard B. Turer
*Attorney, Agent, or Firm*—Stevens, Davis, Miller & Mosher

[57] ABSTRACT

An ethylene-propylene rubber composition which consists essentially of a physical mixture of 97 to 70 % by weight of an ethylene-propylene rubber and 3 to 30 % by weight of an ethylene-propylene block copolymer having 1 to 30 ethylene-propylene bonded units, an intrinsic viscosity of 1.5 to 3.5 dl/g as measured in o-dichlorobenzene at 110°C and a propylene content of 20 to 80 % by weight. Said composition is excellent in both mill processability and extrudability.

8 Claims, No Drawings

COMPOSITION COMPRISING AN ETHYLENE-PROPYLENE RUBBER AND AN AMORPHORES ETHYLENE-PROPYLENE BLOCK COPOLYMER

This invention relates to an ethylene-propylene rubber composition having an excellent processability. More particularly, it relates to a composition having an excellent mill processability and extrudability and consisting of a physical mixture of an ethylene-propylene rubber and an ethylene-propylene block copolymer.

Ethylene-propylene rubbers (EPM) and ethylenepropylene-diolefin terpolymer rubber (EPDM) have been produced with a Ziegler-Natta catalyst consisting of a combination of a vanadium compound and an aluminum compound on a commercial scale. EPM and EPDM have favorable features concerning weather-resistance and ozone-resistance, while they are inferior in roll processability, tackiness and adhesion to generally used rubbers, such as natural rubber, styrene-butadiene rubber, butadiene rubber, etc. Further, EPM and EPDM have a low green rubber strength and tend to cause cold-flow. In particular, when they are subjected to roll-mill having a narrow space, holes and cracks are formed in the rubber bands and when subjected to rolls having a wide space the rubber does not form a good band and is only loosely wound around the roll-mill.

Hitherto, various attemps have been made to enhance the mill processability of EPM or EPDM. One is a method of widening the molecular weight distribution by blending two rubbers having different molecular weights (Japanese Patent Publication No. 29012/71). However, the blend thus obtained is not still sufficient in mill processability, and has the disadvantages that when extruded, the surface of the extruded rubber tube is roughened and the rate of extrusion per unit time is small.

It is an object of this invention to provide an ethylene-propylene rubber having an improved processability, especially mill processability and extrudability.

It is a further object of the invention to provide an ethylene-propylene rubber composition which does not have the above-mentioned disadvantages of the conventional rubbers.

Other objects and advantages of the invention will become apparent from the following description.

The inventors have done extensive research on ethylene-propylene rubbers (EPM and EPDM) to find that an ethylene-propylene rubber composition consisting essentially of a physical mixture of 97 to 70 % by weight of an ethylene-propylene rubber and 3 to 30 % by weight of an ethylene-propylene block copolymer having an intrinsic viscosity of 1.5 to 3.5 dl/g as measured in o-dichlorobenzene at 110°C and a propylene content of 20 to 80 % by weight, the number of the ethylene and propylene bonded units being 1 to 30

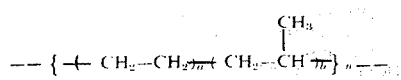

wherein $n = 1$–$30$, and $a$ and $b$ each are at least 10] can achieve the objects mentioned above.

The term "ethylene-propylene rubber" used herein means copolymers of ethylene and propylene and interpolymers of ethylene, propylene and at least one non-conjugated diene, the rubbery properties of which are due to ethylene and propylene. The weight ratio of ethylene and propylene is preferably 90:10 to 20:80, more preferably 75:25 to 40:60. Such polymers can be prepared by various methods, for example, by copolymerizing ethylene, propylene and non-conjugated dienes in a liquid hydrocarbon or halohydrocarbon in the presence of a mixed catalyst of an organometallic compound, such as ethylaluminum dichloride, and a transition metal compound, such as vanadium oxytrichloride. The non-conjugated dienes in this case include dicyclopentadiene, methyltetrahydroindene, methylenenorbornene, ethylidenenorbornene, 1,4-hexadiene, 1,3-cyclooctadiene, 1,4-pentadiene, 1,5-hexadiene, 1,7-octadiene and the like. The catalyst for the copolymerization can be prepared by mixing a vanadium compound, such as halides, oxyhalides, acetylacetonates or esters of vanadium metal, for example, vanadium tetrachloride, vanadium oxytrichloride, vanadyl acetylacetonate, vanadium triacetylacetonate, vandyl trialkoxides, halogenated vanadyl alkoxides, with an organoaluminum compound, for example, triethylaluminum, triisobutylaluminum, trihexylaluminum, ethylaluminum dichloride diethyaluminum monochloride, ethylaluminum sesquichloride, diisobutylaluminum monochloride, isobutylaluminum dichloride, isobutylaluminum sesquichloride or the like, or a mixture thereof. As the polymerization solvents, there may be used any inert organic solvent, for instance, an aliphatic hydrocarbon, such as propane, butane, pentane, hexane, etc.; an aromatic hydrocarbon, such as benzene, xylene, toluene, etc.; alicyclic hydrocarbon, such as cyclohexane, etc.; or a halogenated hydrocarbon, such as tetrachloroethylene, trichloroethylene, monochlorobenzene, etc., or a mixture thereof.

In the composition of this invention, the proportion of the ethylene-propylene rubber must be adjusted to 97 to 70 % by weight. When the proportion of ethylenepropylene rubber exceeds 97 % by weight, the mill processability of the composition is not sufficiently improved. When it is less than 70 % by weight, the properties as rubber are deteriorated.

The ethylene-propylene rubber preferably has a Mooney viscosity of 30 to 120.

The ethylene-propylene block copolymer used in this invention has 1 to 30 ethylene-propylene bonded units ($n = 1$–$30$), an intrinsic viscosity of 1.5 to 3.5 dl/g as measured in o-dichlorobenzene at 100°C, and a propylene content of 20 to 80 % by weight. The ethylene-propylene block copolymer is preferably free from crystalline portion, and if necessary, may be used after treating the block copolymer with a solvent which can be used as the polymerization solvent for the ethylene-propylene rubber to remove the crystalline portion.

When the number of ethylene-propylene bonded units exceeds 30, the characteristics as block copolymer are lessened and the degree of improvement in mill processability is lowered. When the propylene content in the block copolymer is outside the range of 20 to 80 % by weight, the composition containing the block copolymer at a certain proportion has undesirable properties as rubber. For example, the glass transition temperature of the composition is too high. When the intrinsic viscosity is less than 1.5 dl/g, the mechanical strength of the composition is too low, and when it is more than 3.5 dl/g, the properties as rubber are not sufficient.

The ethylene-propylene block copolymer can be produced by a known-method, for instance, the method disclosed in G. Bier et al., Makromol. Chem., 44, 347 (1961). In the production of the ethylene-propylene block copolymer, usually, a Ziegler catalyst is employed. Propylene or ethylene is introduced into a reaction vessel containing the catalyst and maintained at the desired pressure for the desired period of time to effect the reaction. When the desired reaction period of time has lapsed, unreacted monomer is removed and then ethylene or propylene is introduced into the reaction vessel and maintained at the desired pressure for the desired period of time. Finally unreacted monomer is removed. Such a series of operations are repeated as one unit to control the number of the bonded units of the ethylene-propylene block copolymer.

The blending of the ethylene-propylene rubber with the ethylene-propylene block copolymer may be effected by any method. For instance, when they are solid, they may be blended by means of roll-mill, a Banbury mixer or an extruder. When the ethylene-propylene block copolymer in soluble in a solvent in which the ethylene-propylene rubber is soluble, both may be mixed in a solvent.

The invention is further explained in detail in the following Examples, which are not by way of limitation but by way of illustration.

EXAMPLES 1 to 7

Various ethylene-propylene rubbers were uniformly blended with various ethylene-propylene block copolymers by a solution blending or roll-mill blending method to obtain compositions.

The mill processability and extrudability of the thus obtained compositions were estimated to obtain the results shown in Tables 1 and 2, respectively.

From these results, it can be seen that in all cases, the composition of this invention is superior in processability to ethylene-propylene rubber alone.

| Example No. | Trade name |
|---|---|
| 1 | Esprene 501 (registered trademark) of Sumitomo Chemical Company Limited (Propylene content, 44 wt %; iodine value, 10; third component, ethylidenenorbornene |
| 2 | Same as above |
| 3 | Same as above |
| 4 | Mitsui EP T3045 of Mitsui Petrochemical Co., Ltd. (Propylene content, 50 wt %; iodine value, 10; third component, ethylidenenorbornene) |
| 5 | Esprene 501A (registered trademark) of Sumitomo Chemical Company Limited (Propylene content, 50 wt %; iodine value, 10; third component, ethylidenenorbornene) |
| 6 | Esprene 301 (registered trademark) of Sumitomo Chemical Company Limited (Propylene content, 35 wt %; iodine value, 10; third component, dicyclopentadiene) |
| 7 | Esprene 301A (registered trademark) of Sumitomo Chemical Company Limited (Propylene content, 50 wt %; iodine value, 10; third component, ethylidenenorbornene) |

Table 2

| Sample Estimate item | Extrudability | | | |
|---|---|---|---|---|
| | Esprene 501 A | Composition of Example 1 | Composition of Example 4 | Composition of Example 6 |
| Extrusion rate (g/min) | 44 | 88 | 106 | 75 |
| Extrusion velocity (m/min) | 1.51 | 5.00 | 5.50 | 4.16 |
| Swelling (%) | 15.0 | 9.8 | 10.9 | 12.3 |
| Surface state | B - 4 | A - 6 | A - 10 | A - 6 |

Note:- Experiment conditions:
(1) Recipe
    Sample          100 parts by weight
    Dixyl clay      100 ″
    Oil               20 ″
    Zinc oxide      5 ″
    Stearic acid    1 part by weight
(2) Extruder
    30 mm φ rubber extruder L/D = 10
(3) Screw
    Equal pitch, root diameter increasing type
(4) Die
    ASTM Garvey-die (½ scale)
(5) Screw revolution velocity: 40 rpm.
(6) Temperature
    Head: 100°C
    Barrel: I 90°C, II 70°C, III 60°C
    Hopper: 30°C
(7) The estimation of the surface state was based on the B method of ASTM. The surface state is lowered in the following order:
    A - 10 > A - 6 >> B - 4.

Table 1

| Ex. No. | Starting ethylene-propylene rubber | | | Roll Processability Starting ethylene-propylene block copolymer | | | Present ethylene-propylene rubber composition | | |
|---|---|---|---|---|---|---|---|---|---|
| | Intrinsic viscosity (dl/g) | 100°C $ML_{1+4}$ | Mill processability | Intrinsic viscosity (dl/g) | Propylene content (wt %) | Number of ethylene-propylene bonded units | Ethylene-propylene block copolymer content (wt %) | 100°C $ML_{1+4}$ | Mill processability |
| 1 | 1.69 | 54 | B | 1.90 | 76 | 15 | 5 | 59 | A |
| 2 | 1.71 | 58 | B | 2.22 | 58 | 10 | 5 | 46 | A |
| 3 | 1.71 | 58 | B | 1.99 | 55 | 8 | 5 | 46 | A |
| 4 | 1.80 | 42 | B | 1.82 | 40 | 28 | 20 | 44 | A |
| 5 | 1.87 | 46 | B | 1.90 | 31 | 20 | 10 | 42 | A |
| 6 | 1.75 | 55 | B | 3.10 | 30 | 5 | 25 | 60 | A |
| 7 | 1.88 | 46 | B | 2.51 | 23 | 1 | 25 | 55 | A |

Note: - 1. In Examples 1 to 5, solution blending method was used and in Examples 6 and 7, roll-mill blending method was used
2. The intrinsic viscosity was measured in o-dichlorobenzene at 110°C.
3. The mill processability was estimated based on the following standards:
    A: The rubber is easily wound firmly around the roll without sagging to form a stable sheet free from holes and cracks.
    B: The rubber is loosely wound around the roll-mill to form a sheet with small holes and cracks.
4. The trade names of the starting ethylene-propylene rubber used are as follows:

What is claimed is:

1. A composition having an improved processability, which consists essentially of a physical mixture of
    97 to 70% by weight of an ethylene-propylene rubber selected from the group consisting of a copolymer of ethylene and propylene and an interpolymer of ethylene, propylene and at least one non-conjugated diene, the weight ratio of ethylene to propylene in said rubber ranging from 90:10 to 20:80, and
    3 to 30% by weight of an ethylene-propylene block copolymer, said block copolymer being free from crystalline portion and having 1 to 30 ethylene-propylene bonded units, an intrinsic viscosity of 1.5 to 3.5 dl/g as measured in o-dichlorobenzene at 110°C and a propylene content of 20 to 80% by weight.

2. A composition according to claim 1, wherein the at least one non-conjugated diene is selected from the group consisting of di-cyclopentadiene, methyltetrahydroindene, methylenenorbornene, ethylidenenorbornene, 1,4-hexadiene, 1,3-cyclooctadiene, 1,4-pentadiene, 1,5-hexadiene and 1,7-octadiene.

3. A composition according to claim 1, wherein the propylene content of the ethylene-propylene block copolymer is 23 to 76 % by weight.

4. A composition according to claim 3, wherein the ethylene-propylene block copolymer has an intrinsic viscosity of 1.82 to 3.10 dl/g as measured in o-dichlorobenzene at 110°C.

5. A composition according to claim 1, wherein the proportion of the ethylene-propylene block copolymer is 5 to 25 % by weight.

6. A composition according to claim 1, wherein the non-conjugated diene is selected from the group consisting of ethylidenenorbornene and dicyclopentadiene.

7. A composition according to claim 1, wherein the rubber has a propylene content of 35 to 50 % by weight.

8. A composition according to claim 1, wherein the rubber has a Mooney viscosity of 30 to 120.

\* \* \* \* \*